United States Patent
Potharaju et al.

(10) Patent No.: US 10,877,795 B2
(45) Date of Patent: Dec. 29, 2020

(54) AUTOMATIC TUNING OF A DATAFLOW EXECUTION GRAPH

(71) Applicant: Microsoft Technology Licensing, LLC, Redmond, WA (US)

(72) Inventors: Rahul Potharaju, Redmond, WA (US); Terry Yumin Kim, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/045,506

(22) Filed: Jul. 25, 2018

(65) Prior Publication Data
US 2020/0034185 A1    Jan. 30, 2020

(51) Int. Cl.
G06F 9/44    (2018.01)
G06F 9/46    (2006.01)

(52) U.S. Cl.
CPC ..................... *G06F 9/46* (2013.01)

(58) Field of Classification Search
CPC .......................................... G06F 9/46
USPC ................................ 717/133–144
See application file for complete search history.

(56) References Cited

U.S. PATENT DOCUMENTS

| 9,674,249 | B1 | 6/2017 | Kekre et al. |
| 2015/0301861 | A1* | 10/2015 | LaChiusa ............ G06F 11/3072 718/102 |
| 2017/0351633 | A1 | 12/2017 | Goh |

OTHER PUBLICATIONS

"International Search Report and Written Opinion Issued in PCT Application No. PCT/US2019/038081", dated Sep. 10, 2019, 12 Pages.

* cited by examiner

*Primary Examiner* — Chuck O Kendall
(74) *Attorney, Agent, or Firm* — Fiala & Weaver P.L.L.C.

(57) ABSTRACT

At least some embodiments described herein relate to the automatic tuning of a dataflow execution graph. Such dataflow execution graphs are often used to execute some processing against a stream of data messages. A performance parameter of the dataflow execution graph is monitored, and compared against a service level objective. Based on the comparison, it is automatically decided whether a configuration of the dataflow execution graph should be changed. If a change is decided to be made, the configuration of the dataflow execution graph is altered. Thus, rather than require explicit instructions to change the configuration of a dataflow execution graph, the configuration of a dataflow execution graph is changed (or tuned) depending on compliance of performance with a service level objective.

20 Claims, 10 Drawing Sheets

U.S. 10,877,795 B2

AUTOMATIC TUNING OF A DATAFLOW EXECUTION GRAPH

BACKGROUND

Large scale cloud and Internet service providers typically generate millions of events per second. To handle such high event throughput, events are often accumulated, prior to being processed as a batch. More recently, to reduce latency and to ensure timely event processing, stream processing systems avoid batching by processing the events as a stream.

There can be high variability (called herein "temporal variability") in the volume of events that are being streamed with each event stream. For instance, an event stream can include a mix of expected events (e.g., processing needs during the day can be typically higher than at night, and so forth), and unexpected events (e.g., dramatic stock market changes, and so forth). Furthermore, each event stream has different resource requirements due to there being different workload characteristics (called herein "spatial variability") across event streams. Furthermore, in large-scale systems, there are inevitable failures and hardware heterogeneity that make it hard to ensure stable performance in processing event streams. To handle these variabilities and uncertainties, users of stream processing systems (typically system administrators) often provision resources with a safety factor, leaving many resources idle or underutilized.

Many existing stream processing systems adopt a streaming dataflow computational model. In this model, a computational job is represented as a directed acyclic graph (DAG) of operators, which is also called a "dataflow execution graph". Although such operators may be stateless, such operators are most often stateful in that they maintain mutable local state. Each operator sends and/or receives logically timestamped events along directed edges of the DAG. Upon receiving an event along an input edge(s), an operator updates its local state if appropriate, potentially generates new events, and sends those new events to downstream operators along output edge(s). Operators without input edges are termed "source" operators, or simply "sources". Operators without output edges are termed "sink" operators, or simply "sinks". An edge in a DAG has no state but can have configurable properties. For example, a property of an edge might be queue size thresholds that trigger back-pressure.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the automatic tuning of a dataflow execution graph. Such dataflow execution graphs are often used to execute some processing (such as in response to a query) against incoming data messages (either as a stream or in batches). In accordance with the principles described herein, a performance parameter of the dataflow execution graph is monitored and compared against a service level objective. Based on the comparison, it is automatically decided whether a configuration of the dataflow execution graph should be changed. If a change is decided to be made, the configuration of the dataflow execution graph is altered.

Thus, rather than require explicit instructions to change the configuration of a dataflow execution graph, the principles herein automatically change the configuration of a dataflow execution graph depending on compliance with a service level objective. The configuration may thus be altered without contemporaneous attention from a user or administrator, while maintaining expected performance standards. Thus, the configuration may be more frequently and accurately altered to thereby improve performance of the dataflow execution graph as the dataflow execution graph encounters changing conditions (such as spatial and temporal variability), and without inconveniencing a user.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

As a general introduction, at least some embodiments described herein relate to the automatic tuning of a dataflow execution graph. Such dataflow execution graphs are often used to execute some processing against incoming data messages, whether as a stream or in batches. As an example, such dataflow execution graphs may represent a standing or streaming query. In accordance with the principles described herein, a performance parameter of the dataflow execution graph is monitored, and compared against a service level objective. Based on the comparison, it is automatically decided whether a configuration of the dataflow execution graph should be changed. If a change is decided to be made, the configuration of the dataflow execution graph is altered. This monitoring and reconfiguration may be repeatedly and/or continuously performed in order to tune the dataflow execution graph as the graph encounters changing situations so as to accomplish the service level objective.

Figure 1:
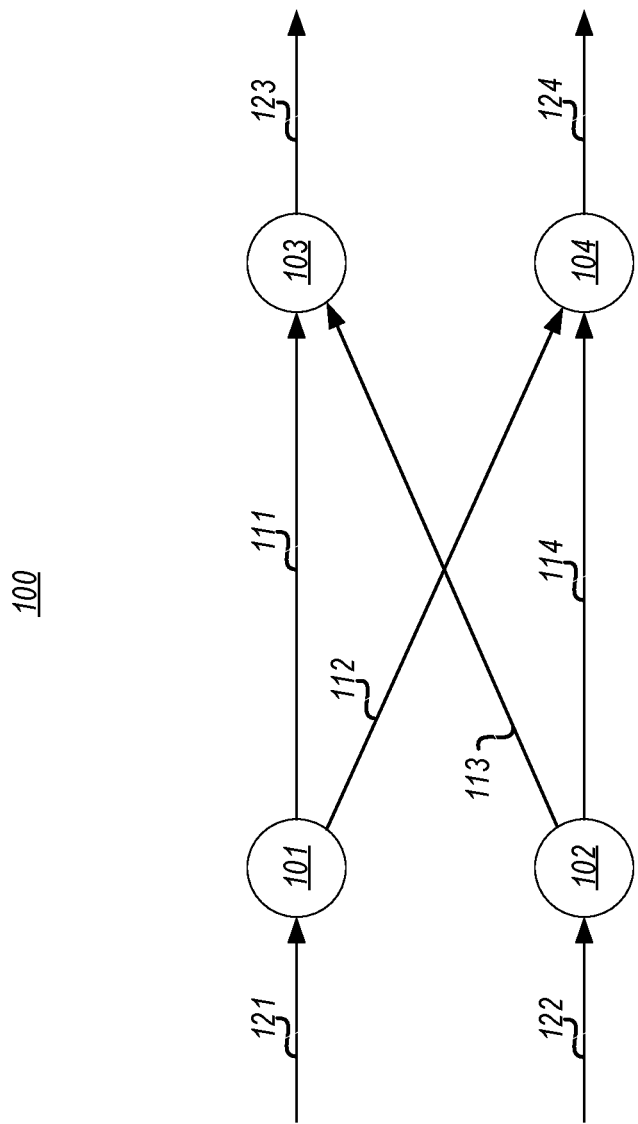
FIG. 1 illustrates an example dataflow execution graph in the form of a directed acyclic graph (DAG) that has multiple operators and edges, and is provided as merely one example of an innumerable variety of dataflow execution graphs.

First, the concept of a dataflow execution graph will be described with respect to FIG. 1 prior to a more detailed description of the concept of tuning the performance of a dataflow execution graph. In the dataflow computational model, a computational job is represented as a directed acyclic graph (DAG) of operators. Such a graph is also called a dataflow execution graph. FIG. 1 illustrates a very simple example of a dataflow execution graph 100, which includes operators 101 through 104. Each operator may be an executable component, such as the executable component 906 of the computing system 900 described below with respect to FIG. 9.

Although dataflow execution graph operators may be stateless, such operators are often stateful in that they maintain mutable local state. Each operator sends and/or receives logically timestamped data messages along directed edges of the dataflow execution graph. In the example dataflow execution graph 100, there are four directed edges 111 through 114.

Upon receiving a data message along an input edge, an operator performs its function, updates its local state if appropriate, potentially generates new data messages, and sends those new data messages to downstream operators along output edge(s). Operators without input edges are termed "source" operators, or simply "sources". These source operators receive the raw input data messages (either as a stream, or in batches) received by the dataflow execution graph. In the example dataflow execution graph 100, the source operator 101 receives input data messages (as represented by arrow 121), performs a function, generates resulting data message(s), and sends those resulting data messages along directed edges 111 and 112, as appropriate. The source operator 102 receives input data messages (as represented by the arrow 122), performs its function, generates resulting data message(s), and sends those resulting data messages along directed edges 113 and 114, as appropriate.

Operators without output edges are termed "sink" operators, or simply "sinks". One or more of these sink operators generate the output result of the dataflow execution graph. In the example dataflow execution graph 100, the sink operator 103 receives data messages along directed edges 111 and 113, performs its function, and generates resulting output data (as represented by arrow 123). The sink operator 104 receives data messages along directed edges 112 and 114, performs its function, and generates resulting output data (as represented by arrow 124).

An edge in a dataflow execution graph often has no state, but can have properties. For example, a property of an edge might be a queue backlog size threshold that triggers backpressure. Edges can also have state that is useful. For instance, an edge might include state in the form of data that is being sent (i.e., data that is "in-flight" between the respective operators). During checkpointing, an edge's state might also be checkpointed to avoid replaying data in-flight.

A dataflow execution graph may include any number of operators and any number of edges in any configuration. The dataflow execution graph may be as simple as a single operator, with zero edges. On the other hand, the dataflow execution graph may be indescribably complex, having innumerable operators and edges therebetween. Accordingly, the example dataflow execution graph 100 really is just one simple example of an innumerable possible variety of dataflow execution graphs. A dataflow execution graph may be operated on a single computing system such as the computing system 900 described below with respect to FIG. 9, or may be distributed across multiple computing systems. As an example, the dataflow execution graph may operate in a cloud computing environment.

Figure 2:
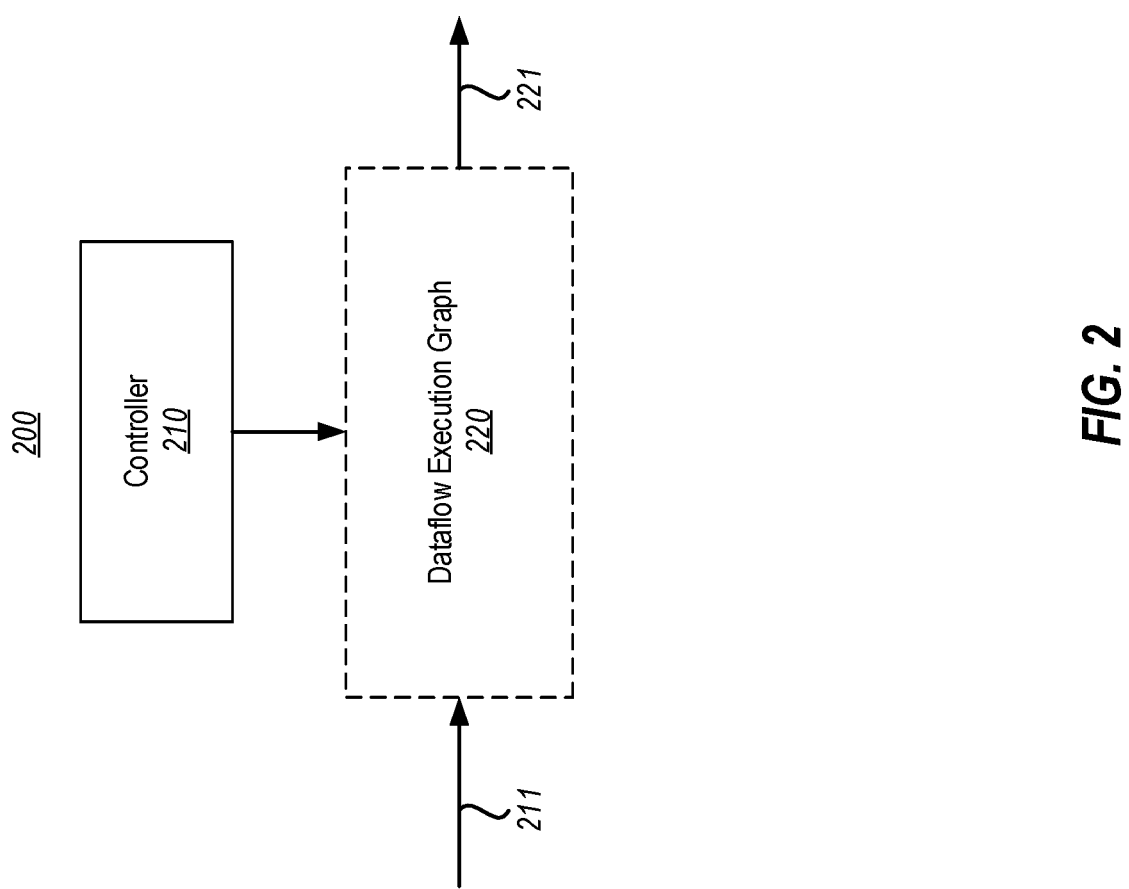
FIG. 2 illustrates an environment in which the principles described herein may be employed, which includes a controller and a corresponding dataflow execution graph.

Now that an introduction to dataflow execution graphs has been provided with respect to FIG. 1, more details regarding how a dataflow execution graph may be tuned using the principles described herein will be described with respect to subsequent figures. For instance, FIG. 2 illustrates an environment 200 in which the principles described herein may be employed.

The environment 200 includes a controller 210, and a dataflow execution graph 220. Data messages 211 are fed (either as a stream or in batches) into the dataflow execution graph 220. The dataflow execution graph 220 performs a computational job on the input data messages 211, and generates output results 221. As an example, the computational job may be a streaming or standing query. The controller 210 may be an executable component, such as the executable component 906 described below with respect to FIG. 9. The dataflow execution graph 220 may be on the same computing system as, or on a different computing system than, the controller 210. In one embodiment, the controller 210 is assigned specifically to the dataflow execution graph 220, and to no other. Thus, risk of failure of the controller 210 is bound to only a single dataflow execution graph.

Figure 3:
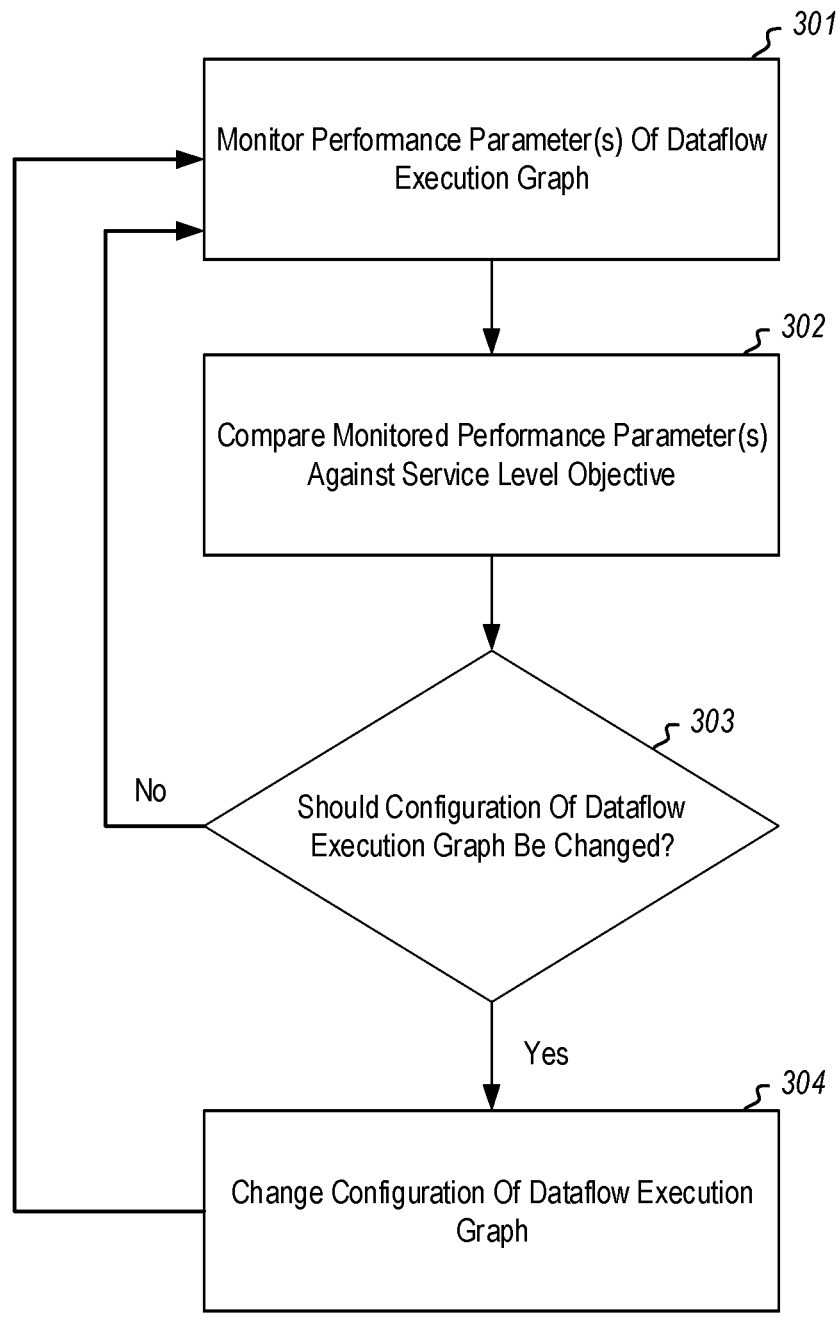
FIG. 3 illustrates a flowchart of a method for automatically tuning performance of a dataflow execution graph, in accordance with the principles described herein.

FIG. 3 illustrates a flowchart of a method 300 for automatically tuning performance of a dataflow execution graph, in accordance with the principles described herein. The method 300 may be performed within the environment 200 of FIG. 2. Accordingly, the method 300 of FIG. 3 will now be described with frequent reference to the environment 200 of FIG. 2.

The method 300 includes monitoring a performance parameter of a dataflow execution graph (act 301). For instance, the controller 210 of FIG. 2 may monitor the performance of the dataflow execution graph 220 of FIG. 2. The dataflow execution graph may have any number of performance parameters. The monitoring act (act 301) may monitor a single one of the performance parameters, or may monitor multiple performance parameters. An example of a performance parameter is latency—or the amount of time it takes for a data message provided to the dataflow execution graph to be reflected in the results generated by the dataflow execution graph. Another example of a performance parameter is throughput of the processing of events by the dataflow execution graph. For instance, throughput may be measured by the number of input data messages processed by the dataflow execution graph for a particular unit of time (i.e., a rate of processing data messages). The unit of time might perhaps be a rolling or sliding window, or may be a tumbling or hopping window.

Figure 4:
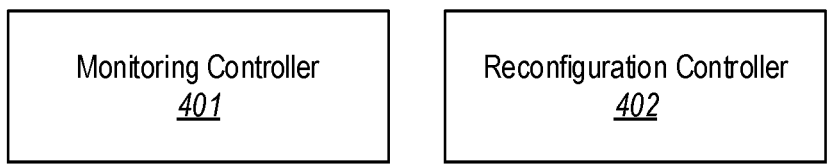
FIG. 4 illustrates a controller set that may be used to perform the method of FIG. 3, and which includes a monitoring controller and a reconfiguration controller, amongst potentially other controllers as well.

In one embodiment, the method 300 is performed by a single controller, such as the controller 210 of FIG. 2. However, in other embodiments, multiple controllers may be used to perform the method 300 of FIG. 3. In this sense, the controller 210 of FIG. 2 may represent a collection of multiple controllers. For instance, the monitoring act 301 may be performed by a separate controller. FIG. 4 illustrates a controller set 400 that may be used to perform the method 300 of FIG. 3. The monitoring controller 401 may perform monitoring of one or more performance parameters of the dataflow execution graph. Although only one monitoring controller 401 is illustrated, there may be other monitoring controllers for monitoring other performance parameters. In one embodiment, the monitoring controller 401 is assigned only to the dataflow execution graph 220, such that the risk of failure of the monitoring controller 401 is bound only to that dataflow execution graph 220.

Returning to the method 300 of FIG. 3, the method 300 includes comparing the monitored performance parameter against a service level objective (act 302). Based on the comparison, the method 300 automatically decides whether a configuration of the dataflow execution graph should be changed (decision block 303). If the dataflow execution graph should not be changed based on the comparison ("No" in decision block 303), then the service level objective is being properly met by the dataflow execution graph. Thus, no change to configuration is made, and the monitoring continues (act 301). The loop represented by acts 301, 302, and decision block 303 back to act 301 may be continuously or repeatedly performed when the comparison results in no change being made to the configuration.

On the other hand, if the determination results in a decision that the configuration should be changed ("Yes" in decision block 303), then there is a possibility that the service level objective might not be met unless a change to the configuration is made. In that case ("Yes" in decision block 303), the configuration of the dataflow execution graph is changed (act 304), and the process returns to continue monitoring the performance parameter(s) (act 301). The loop represented by acts 301, 302, decision block 303, and act 304 back to act 301 may be continuously or repeatedly performed to thereby continuously or repeatedly alter the configuration of the dataflow execution graph. Thus, the dataflow execution graph is frequently altered (or tuned) for good performance that falls within the service level objective.

The altering of the configuration (act 304) may also be performed by a separate controller. Referring to FIG. 4, a reconfiguration controller 402 may be used to perform the altering of the configuration of the dataflow execution graph 220. Although only one reconfiguration controller is illustrated, there may be other reconfiguration controllers for monitoring other performance parameters. For instance, some reconfiguration controller may be tailored to efficiently perform certain types of reconfiguration. In one embodiment, the reconfiguration controller 402 is assigned only to the dataflow execution graph 220, such that the risk of failure of the reconfiguration controller 402 is bound only to that dataflow execution graph 220. In one embodiment, the monitoring controller 401 and/or the reconfiguration controller 402 also performs the comparison (act 302) and/or the determination (decision block 303). The ellipsis 403 represents that there may be multiple monitoring or reconfiguration controllers, or other types of controllers, in the controller set 400.

Although the principles described herein are not limited to any particular type of change to configuration of the dataflow execution graph, as examples only, three different types of configuration changes will now be described. The configuration changes that will be discussed in further detail include 1) changes to operational parameters of the dataflow execution graph itself, 2) changes to state or parameters of components (operators or edges) of the dataflow execution graph, and 3) changes to the structure of the dataflow execution graph. These example change types will now be described in this order.

The first type of configuration change described is a change to an operational parameter of the execution graph itself. As an example, in the case in which the dataflow execution graph processes incoming data messages in batches, an operational parameter might include the size of the batch (in numbers of data messages). Batching provides a trade-off between throughput and latency. Batching has the benefit of reducing the per message operating cost. However, batching does have impact on overall latency in processing the incoming data message. If the batch size is too small, then the number of batches increases, and since time is expended formulating batches, this can increase latency. On the other hand, if the batch size is high, though the number of batches is reduced, the number of data messages per batch increases. Thus, there is latency associated with waiting for data messages to arrive so that a batch may be created in the first place. Somewhere between these two extremes is a batch size where latency is minimized. In complex systems, it is a non-trivial task to identify this batch size, and the ideal batch size may move over time.

For instance, suppose that the service level objective is a throughput of 60 million data messages per second, with an upper bound in latency of 500 milliseconds. Suppose now that every 30 seconds, the controller collects latency samples, updates a moving average of the processing latency, and if needed, performs a reconfiguration of the dataflow execution graph.

Initially (at time equals zero seconds), suppose a conservative batch size of 40,000 messages per batch is selected while measuring latency and throughput. Now suppose that the throughput rate at this batch size is monitored at 50 million data messages per second. This is short of the service level objective of 60 million data messages per second. Thus, 60 million data messages per second would overwhelm the system triggering significant back-pressure within the dataflow execution graph. Because of this back-pressure, latency would be higher, say around one second.

Then, starting at the 30 second mark, to address these shortfalls in the service level objective, the controller doubles the batch size operational parameter to 80,000 messages per batch. Suppose that this leads to a more stable throughput at 60 million messages per second, and gives a stable latency of around 500 milliseconds. At the 60 second mark, suppose the controller tries doubling the batch size again to 160,000 messages per batch. However, the controller finds that this increases latency to above the service level objective, with little improvement in throughput. Thus, at the 90 second mark, the controller reverts back to the batch size of 80,000 messages per batch. Thus, the controller settles on an appropriate parameter value for the dataflow execution graph, without requiring any information other than the service level objective and the actual monitored performance of the dataflow execution graph.

A second type of change in configuration is a change in the state or parameter values of a component of the dataflow execution graph, such as an operator or an edge. For instance, the queue size of an edge could be adjusted, so that back-pressure is applied less frequently by that edge. As another example, the operator may have its priority level changed, so that the operator has more access to processing cycles.

A third type of change in configuration is a change to the actual structure of the dataflow execution graph itself. This change in structure might include adding or removing an operator, or adding or removing an edge, or combinations or multiples of the above.

Such a structural reconfiguration may be a difficult task. Conventionally, to perform such a restructuring, the entire dataflow execution graph must block incoming data messages, while the state of the original dataflow execution graph is checkpointed, the new dataflow execution graph is instantiated, and the checkpointed state is mapped into the new dataflow execution graph. Only then would the incoming data messages be unblocked. This is a significant blocking operation that itself introduces significant latency. Thus, this type of reconfiguration cannot be done too often.

However, with the use of an intermediate dataflow execution graph, one can avoid applying backpressure at the level of the entire dataflow execution graph. Instead, backpressure may be applied at only the operator level, significantly reducing the impact of blocking, and significantly reducing the latency impact associated with restructuring the dataflow execution graph. Thus, restructuring of the dataflow execution graph may be performed more frequently. Thus, restructuring a dataflow execution graph using an intermediate execution graph will now be described.

In this new restructuring mechanism, controller messages are fed along with data messages into the dataflow execution graph. Specifically, the control message may be input to each source operator of the dataflow execution graph 220. The control message is different than the data messages in that the control message is structured to be executable by the dataflow execution graph 220 to actually change the configuration of the dataflow execution graph 220. On the other hand, the data messages do not change the configuration of the dataflow execution graph 220, but are simply processed by the dataflow execution graph 220. As an example, a control message can also contain a small executable program that can be executed by each operator that encounters the control message. This executable program could be an anonymous/lambda function that is to be executed as part of a new dataflow execution graph.

Figure 5:
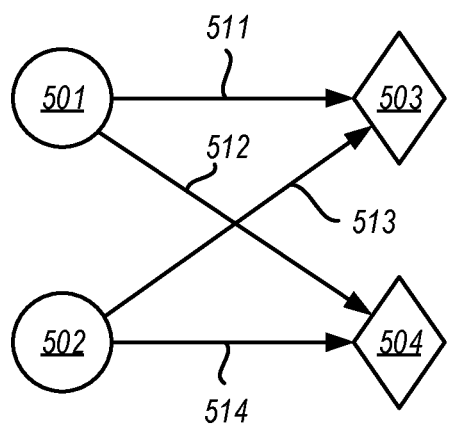
FIG. 5 illustrates an example original dataflow execution graph that is in an example reconfiguration described herein.

In an example, the dataflow execution graph 500 of FIG. 5 will be used as the original or "old" dataflow execution graph in an example configuration that will be described hereinafter. Note that the dataflow execution graph 500 of FIG. 5 is similar to the example dataflow execution graph 100 of FIG. 1, in that operators 501 through 504 of FIG. 5 are the same as operators 101 through 104 of FIG. 1. However, operators 503 and 504 are shown as a rhombus to symbolize that these operators 503 and 504 have state, whereas operators 501 and 502 have no state as symbolized by being represented by a circle. In FIG. 5, the edges 511 through 514 of the dataflow execution graph 500 have the same relationship with operators 501 through 504 as edges 111 through 114 have to the operators 101 through 104 of the dataflow execution graph 100 of FIG. 1.

Figure 6:
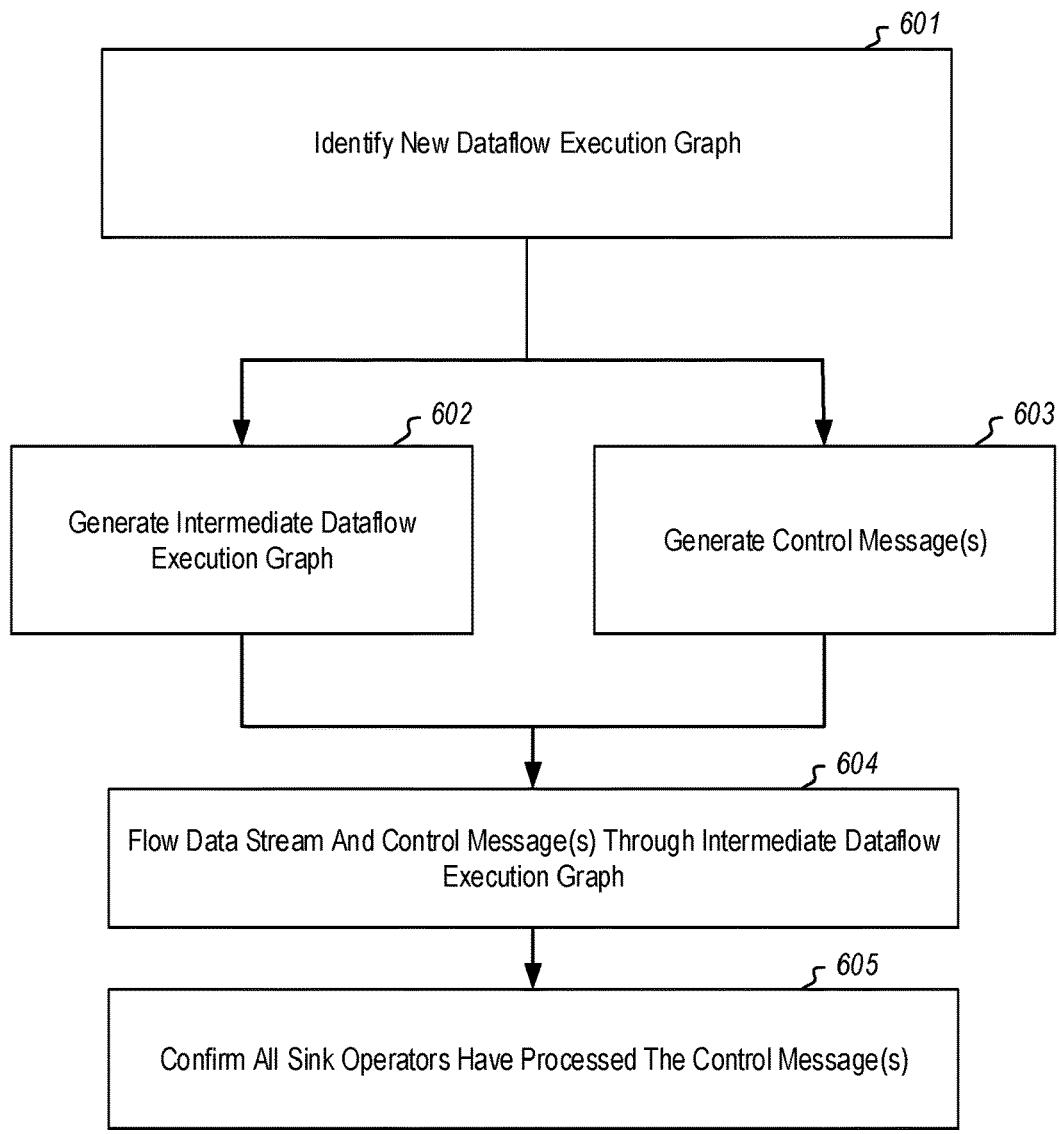
FIG. 6 illustrates a flowchart of a method for restructuring a dataflow execution graph that processes a data stream(s) in accordance with the principles described herein.

The dataflow execution graph 500 will also be referred to herein as the "example original dataflow execution graph" herein. FIG. 6 illustrates a flowchart of a method 600 for modifying a dataflow execution graph that processes a data stream. As the method 600 may be performed by the controller 210 in the environment 200 of FIG. 2, the method 600 of FIG. 6 will be described with respect to the environment 200 of FIG. 200. Also, as the example original dataflow execution graph 500 of FIG. 5 is going to be used as an example dataflow execution graph that is modified, reference to FIG. 5 will also be frequent.

The method 600 determines a new dataflow execution graph that the old dataflow execution graph is to be changed to (act 601). As an example, suppose that the example original dataflow execution graph 500 of FIG. 5 is to be modified to a new dataflow execution graph 700 of FIG. 7. Note the addition of stateful operator 705, and edges 715 and 716 to the original dataflow execution graph 500 would form the new dataflow execution graph 700. This modification might be performed if, for instance, the operators 501 and 502 were mapping operators, and operators 503 and 504 were reducer operators in a map-reduce model, and in which case it was decided to scale-out (i.e., increase) the number of reducer operators by one.

Figure 7:
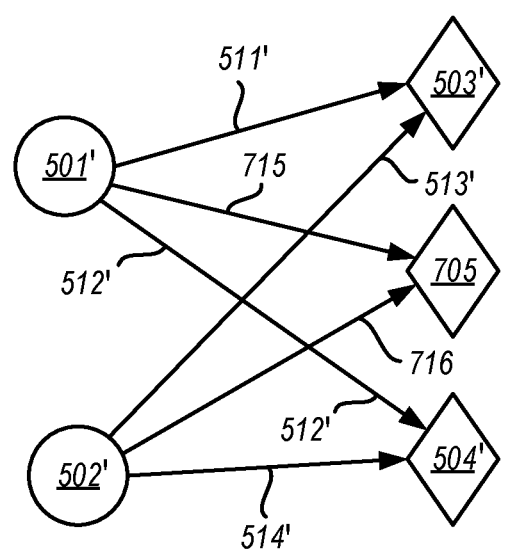
FIG. 7 illustrates an example new dataflow execution graph, which represents a modified version of the original dataflow execution graph of FIG. 5.

The operators 501', 502', 503' and 504' of the example new dataflow execution graph 700 of FIG. 7 are the same operators 501, 502, 503 and 504, respectively, of the example original dataflow execution graph 500 of FIG. 5. Thus, the operators 501 and 501' are common, operators 502 and 502' are common, operators 503 and 503' are common, and operators 504 and 504' are common. However, the prime suffix is added in FIG. 7 to represent that the operator may have its function, parameter(s) and/or state changed as a result of the reconfiguration, and still be considered a common operator between the original and new dataflow execution graphs. Likewise, the edges 511', 512', 513' and 514' of the example new dataflow execution graph 700 of FIG. 7 are the same edges as (or common with) edges 511, 512, 513 and 514, respectively, of the example original dataflow execution graph 500 of FIG. 5. Again, the prime suffix is added to represent that the edge may have its parameter(s) or state changed during the reconfiguration, and still be considered a common edge between the original and new dataflow execution graphs.

The method 600 also includes generating an intermediate dataflow execution graph (act 602) based on both the original dataflow execution graph that is about to be modified as well as the new dataflow execution graph that is to be the result of the modification. More regarding the intermediate dataflow execution graph will be described with respect to the example original dataflow execution graph 500, the example new dataflow execution graph 700, and the associated example intermediate dataflow execution graphs 800A, 800B, and 800C of FIGS. 8A through 8C, respectively.

Suffice it for now to say that the intermediate dataflow execution graph includes at least the common operators of both the original and new dataflow execution graphs, and includes the common edges of both the original and new dataflow execution graphs. For instance, for the example original dataflow execution graph 500, and the example new dataflow execution graph 700, there are common operators 501 through 504 that are within both the example original dataflow execution graph 500 and the example new dataflow execution graph 700. Furthermore, there are common edges 511 through 514 that are within both the example original dataflow execution graph 500 and the example new dataflow execution graph 700.

The method 500 also includes generating one or more control message(s) that are not part of the data stream (act 603). These control message(s) are structured such that, when executed by the operators within the intermediate dataflow execution graph, the intermediate dataflow execution graph will take the form of the new dataflow execution graph. As an example, in the environment 200 of FIG. 2, the controller 210 generates the control message. That control message represents the topology of the new dataflow execution graph, and possibly also new or modified functions that are to be performed by specified operators, new or modified parameters or parameter values that are to be held by operators or edges, and how state is to be allocated amongst multiple stateful operators.

The data stream(s) is/are then flowed to the intermediate dataflow execution graph (act 604) along with the control message(s) (also act 604). Note that this flowing of the data stream(s) is not deferred until the new dataflow execution graph is already established. As an example, in the environment 200 of FIG. 2, the data messages 211 and the control message are fed into the dataflow execution graph 220, which is now the intermediate dataflow execution graph during the reconfiguration. Because of the way the control message(s) is/are structured, the intermediate dataflow execution graph will take the form of the new dataflow execution graph as each operator completes execution of the control message(s).

Specifically, for each operator of the intermediate dataflow execution graph that is not part of the new dataflow execution graph, the operator is shut down after that operator executes at least one (and preferably all) of the control message(s), such that the operator ceases to be able to continue processing data messages of the data stream after shut down. As such, an operator receives a control message on one of its input edges, the operator closes that input channel so that it does not receive data messages on that input edge. After all control messages are received on all of the input edges for that operator, the operator will no longer receive data messages. For each operator of the intermediate dataflow execution graph that is not part of the original dataflow execution graph, that operator begins processing of data messages of the data stream after the operator processes at least one (and preferably all) of the control message(s).

When the sink operators within the intermediate dataflow execution graph complete execution of the control messages, the operators each report the completion to the controller 210. When the controller 210 confirms that all sink operators in the dataflow execution graph have executed the control messages (act 605), the controller 210 can understand that the intermediate dataflow execution graph has now taken the form of the new dataflow execution graph, and that the data stream(s) is/are being fed into and processed by that new dataflow execution graph.

Figure 8A:
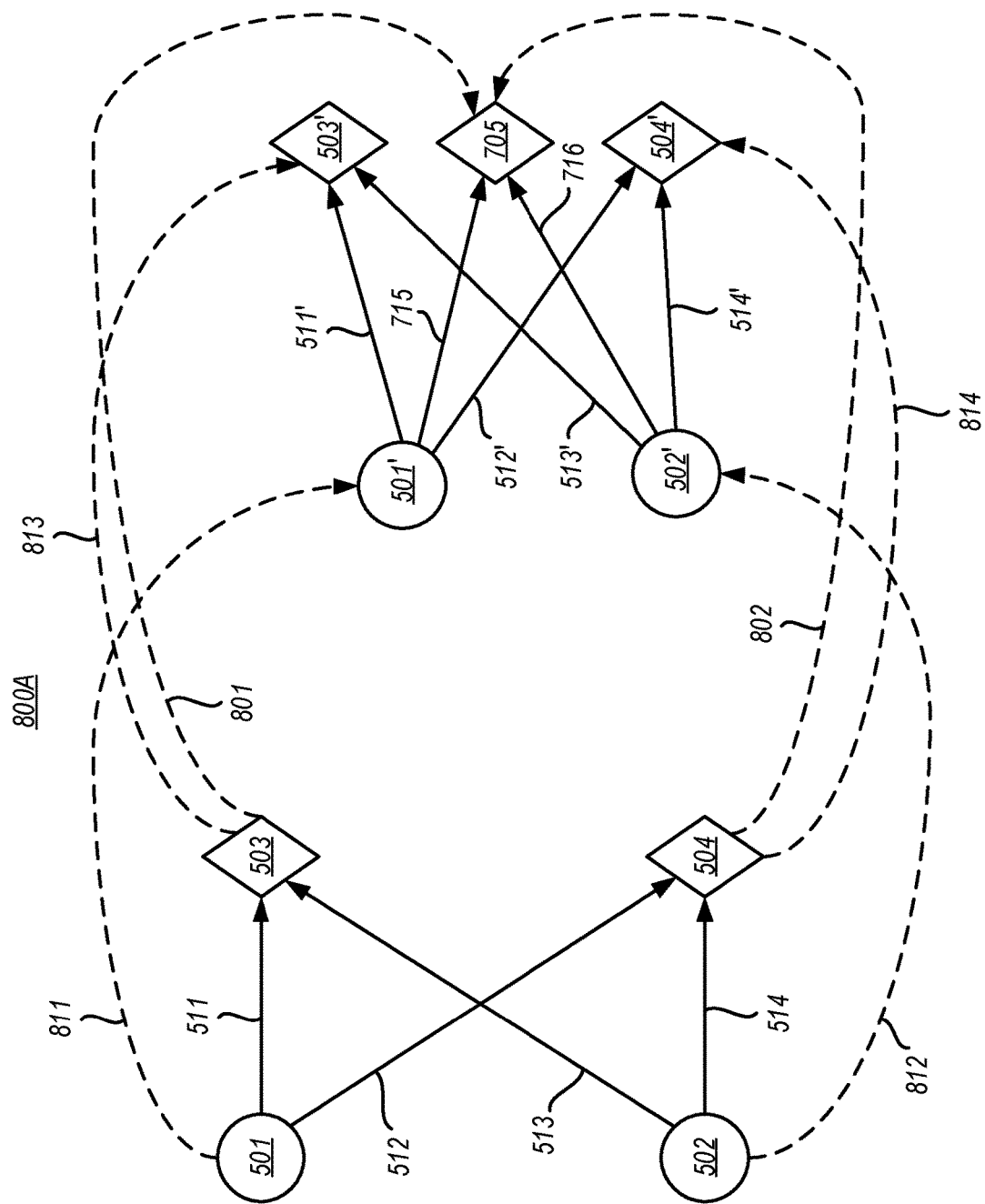
FIG. 8A illustrates a first example intermediate dataflow execution graph used in the example in which the original dataflow execution graph is that of FIG. 5, and the new dataflow execution graph is that of FIG. 7.

FIG. 8A includes one example intermediate dataflow execution graph 800A that is based on the example original dataflow execution graph 500 and the example new dataflow execution graph 700. Specifically, the intermediate dataflow execution graph 800A includes all operators of both the original dataflow execution graph 500 and the new dataflow execution graph 700. That is, the intermediate dataflow execution graph 800A includes operators 501 through 504, 501' through 504' and 705, for both stateless operators and stateful operators. The intermediate dataflow execution graph 800A also includes edges of both the original dataflow execution graph 500 and the new dataflow execution graph 700. That is, the intermediate dataflow execution graph 800A includes edges 511 through 514, 511' through 514', 715 and 716. Such edges are represented by solid-lined arrows.

The intermediate dataflow execution graph 800A also includes additional edges represented by dashed-line arrows. Such edges include edges that capture state dependency relationships between stateful operator(s) of the original dataflow execution graph and stateful operator(s) of the new dataflow execution graph. For instance, suppose that as part of the reconfiguration, some state is to be transferred from operator 503 to new operator 705. As such, there is a new edge 801 representing this dependency. Furthermore, suppose that as part of the reconfiguration, some state is to be transferred from operator 504 to new operator 705. As such, there is a new edge 802 representing this state dependency.

The intermediate dataflow execution graph 800A also includes new edges between each common operator of the original dataflow execution graph 500 and the new dataflow execution graph 700. For instance, there is a new edge 811 from operator 501 to operator 501', a new edge 812 from operator 502 to operator 502', a new edge 813 from operator 503 to operator 503', and a new edge 814 from operator 504 to operator 504'. Thus, the intermediate dataflow execution graph 800A includes nine operators 501 through 504, 501' through 504' and 705; and sixteen edges 511 through 514, 511' through 514', 715, 716, 801, 802, and 811 through 814.

Eventually, the intermediate dataflow execution graph 800A will collapse into the new dataflow execution graph 700 once all operators have completed processing the control message. Recall that for each operator of the intermediate dataflow execution graph 800A that is not part of the new dataflow execution graph 700 (which includes all of the original operators 501, 502, 503 and 504), that operator will shut down after executing the control message received on all of its input edges. Also, for each operator of the intermediate dataflow execution graph 800A that is not part of the original dataflow execution graph 500 (which includes all of the operators 501', 502', 503' and 504'), that operator will begin processing data messages after executing the control message received on each of its input edges.

The control message is provided first to the operators 501 and 502, which respond by each stopping data messages on the input channels. After operator 501 processes the control message, the control message is passed along directed edges 511, 512 and 811 to respective operators 503, 504 and 501', and the operator 501 will thereafter shut down, thereby also extinguishing the directed edges 511, 512 and 811. After operator 502 processes the control message, the control message is passed along directed edges 513, 514 and 812 to respective operators 503, 504 and 502', and the operator 502 will thereafter shut down, thereby also extinguishing the directed edges 513, 514 and 812.

After operator 501' processes the control message, the control message is passed along directed edges 511', 715 and 512' to respective operators 503', 705 and 504', and the operator 501' thereafter begins processing incoming data messages. Likewise, after operator 502' processes the control message, the control message is passed along directed edges 513', 716 and 514' to respective operators 503', 705 and 504', and the operator 502' thereafter begins processing incoming data messages. At this point, the intermediate dataflow execution graph once again accepts input data messages, which is only a brief moment after the intermediate dataflow execution graph stopped accepting input data messages (when the operators 501 and 502 received the control message).

As part of processing the control message, operator 503 will perform some transform on its own state as dictated by the control message, and will provide that transformed state along directed edge 801 to the operator 705. After operator 503 processes the control message, the control message is passed along directed edges 813 and 801 to respective operators 503' and 705, and the operator 503 will thereafter shut down, thereby also extinguishing the directed edges 813 and 801. As part of processing the control message, operator 504 will perform some transform on its own state as directed by the control message, and will provide that transformed state along directed edge 802 to the operator 705. After operator 504 processes the control message, the control message is passed along directed edges 802 and 814 to respective operators 705 and 504', and the operator 504 will thereafter shut down, thereby also extinguishing the directed edges 802 and 814.

After operators 503', 705 and 504' each process the control message, the respective operator thereafter begins processing incoming data messages, and also reports the completion of the processing of the control message to the controller 210. At this point, the intermediate dataflow execution graph 800A has taken the form of the new dataflow execution graph 700, and the data stream is executing on the new dataflow execution graph 700.

While some amount of back-pressure may be caused in this situation, the amount of back-pressure is much less than the freeze-the-world approach where the original dataflow execution graph is completely stopped, the state of the original dataflow execution graph is checkpointed, the new dataflow execution graph is generated, the checkpointed state is transferred to appropriate operators in the new dataflow execution graph, and only then the new dataflow execution graph is started.

Figure 8B:
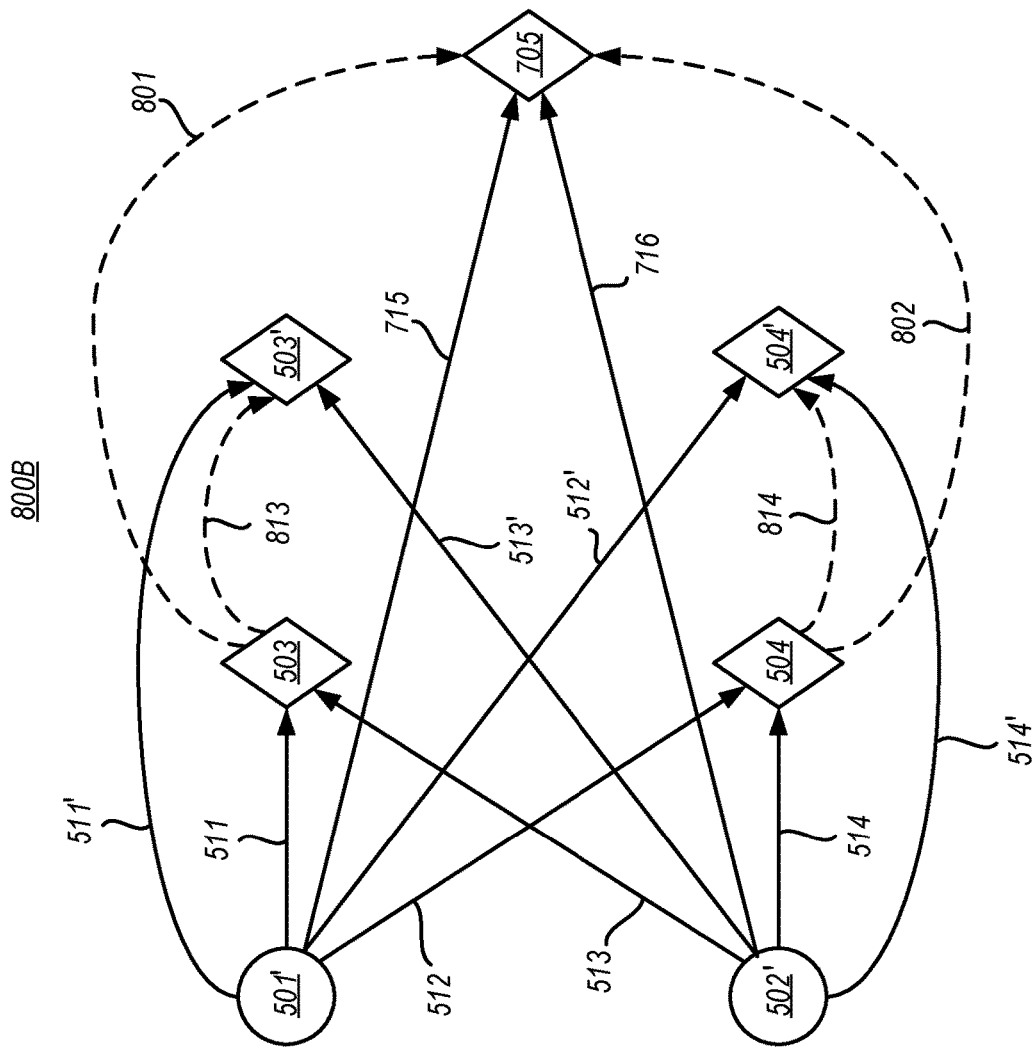
FIG. 8B illustrates a second example intermediate dataflow execution graph, which is the same as that of FIG. 8A, except with an optimization performed to take advantage of the fact that some of the operators do not change their state.
Figure 8C:
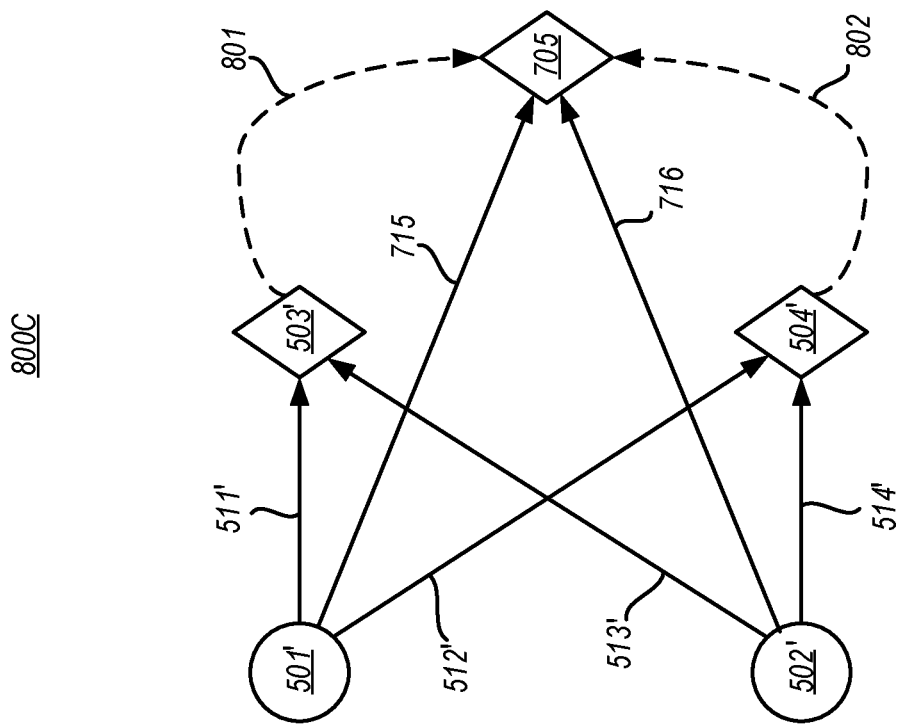
FIG. 8C illustrates a third example intermediate dataflow execution graph, which is the same as that of FIG. 8B, except with another optimization performed to take advantage of the fact that the dataflow execution graph is acyclic.

One optimization is based on recognizing that when the control message does not change the operator's state (e.g., as in the case for operators 501, 501', 502 and 502' since they are stateless), the respective common operators can be collapsed into one operator, eliminating the corresponding link therebetween. FIG. 8B illustrated an example intermediate dataflow execution graph 800B that is similar to the dataflow execution graph 800A of FIG. 8A, except with the described optimization. Specifically, operators 501 and 501' are collapsed into operator 501', and corresponding edge 811 is absent. Also, operators 502 and 502' are collapsed into operator 502', and the corresponding edge 812 is absent. Thus, there are only now seven operators 501', 502', 503, 504, 503', 504' and 705 in the intermediate dataflow execution graph 800B. There are fourteen edges 511 through 514, 511' through 514', 715, 716, 801, 802, 813 and 814, in the intermediate dataflow execution graph 800B.

Another optimization can be formed if the dataflow execution graph is acyclic. In that case, common operators 503 and 503' can be collapsed into operator 503' (eliminating edges 511, 513, and 813), and common operators 504 and 504' can be collapsed into operator 504' (eliminating edges 512, 514, and 814) without breaking the acyclic invariance. Furthermore, such acyclic invariance can be maintained for scaling-out and scaling-in by using hashing algorithms as a partitioning scheme. This collapse leaves remaining only five operators 501' through 504' and 705 in the intermediate dataflow execution graph 800C. There are also eight edges 511' through 514', 801, 802, and 715 and 716 in the intermediate dataflow execution graph 800C.

Accordingly, the principles described herein provide a mechanism for tuning a dataflow execution graph so as to comply with a service level objective. Thus, rather than require explicit instructions to change the configuration of a dataflow execution graph, the principles herein automatically change the configuration of a dataflow execution graph depending on compliance of performance with a service level objective. The configuration may thus be altered without contemporaneous attention from a user or administrator, while maintaining expected performance standards. Thus, the configuration may be more frequently and accurately altered to thereby improve performance of the dataflow execution graph as the dataflow execution graph encounters changing conditions, and without inconveniencing a user.

Because the principles described herein operate in the context of a computing system, a computing system will be described with respect to FIG. 9. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 9:
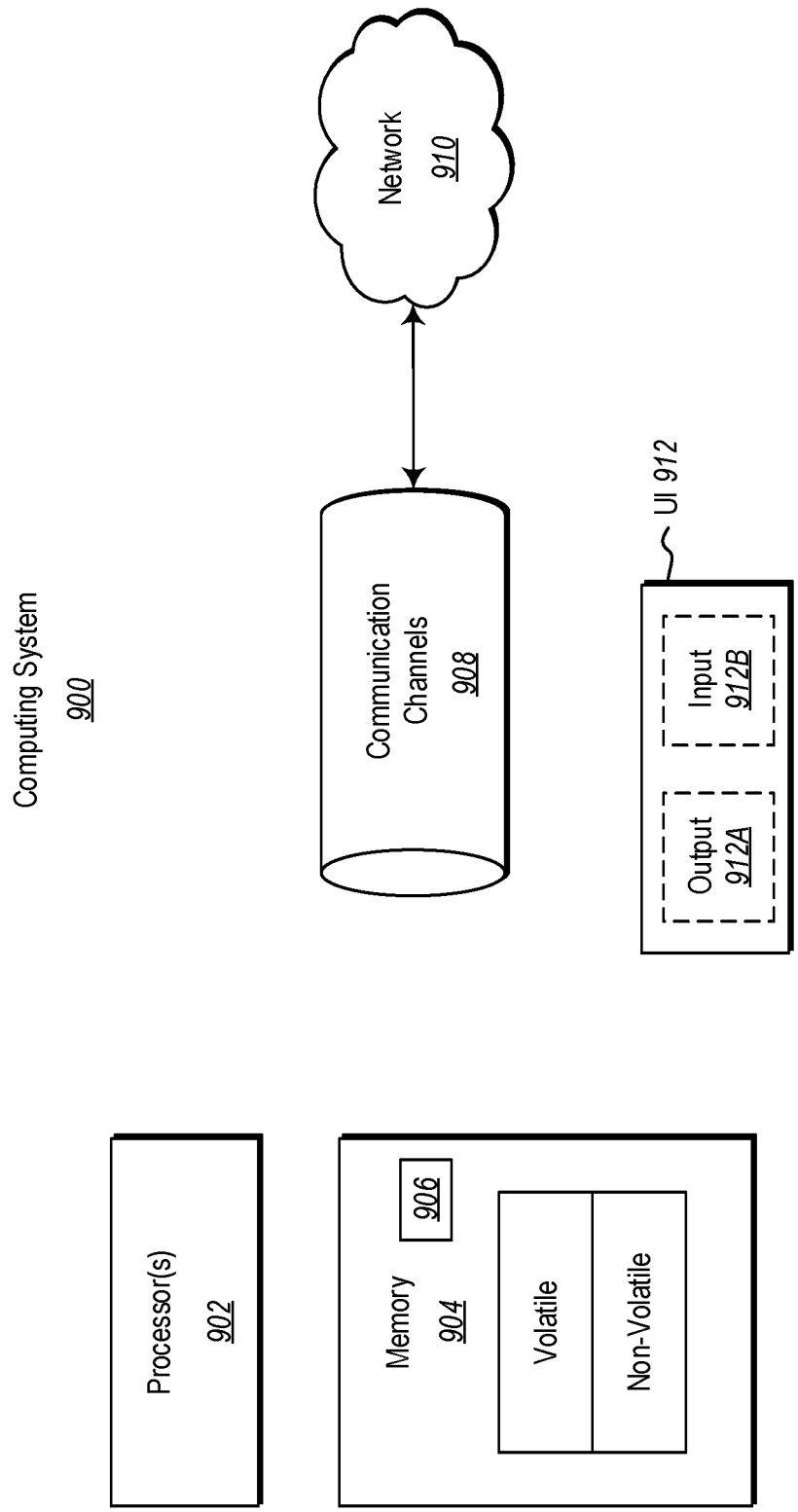
FIG. 9 illustrates an example computer system in which the principles described herein may be employed.

As illustrated in FIG. 9, in its most basic configuration, a computing system 900 typically includes at least one hardware processing unit 902 and memory 904. The memory 904 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 900 has thereon multiple structures often referred to as an "executable component". For instance, the memory 904 of the computing system 900 is illustrated as including executable component 906. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 904 of the computing system 900. Computing system 900 may also contain communication channels 908 that allow the computing system 900 to communicate with other computing systems over, for example, network 910.

While not all computing systems require a user interface, in some embodiments, the computing system 900 includes a user interface 912 for use in interfacing with a user. The user interface 912 may include output mechanisms 912A as well as input mechanisms 912B. The principles described herein are not limited to the precise output mechanisms 912A or input mechanisms 912B as such will depend on the nature of the device. However, output mechanisms 912A might include, for instance, speakers, displays, tactile output, holograms, virtual reality, and so forth. Examples of input mechanisms 912B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Accordingly, the principles described herein provide a mechanism for tuning a dataflow execution graph so as to comply with a service level objective. Thus, rather than require explicit instructions to change the configuration of a dataflow execution graph, the principles herein automatically change the configuration of a dataflow execution graph depending on compliance of performance with a service level objective. The configuration may thus be altered without contemporaneous attention from a user or administrator, while maintaining expected performance standards. Thus, the configuration may be more frequently and accurately altered to thereby improve performance of the dataflow execution graph as the dataflow execution graph encounters changing conditions, and without inconveniencing a user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable media having thereon computer-executable instructions that are structured such that, when executed by the one or more processors, cause the computing system to perform a method for automatically tuning performance of a dataflow execution graph, the method comprising:
   monitoring a performance parameter of the dataflow execution graph, the dataflow execution graph comprising a plurality of operators, each operator configured to send or receive messages along one or more edges of the dataflow execution graph;
   comparing the monitored performance parameter against a service level objective;
   based on the comparison, automatically determining whether a configuration of the dataflow execution graph should be changed; and
   altering the configuration of the dataflow execution graph if the automatic determining results in a decision that the configuration should be changed, the altered configuration comprising at least one of an addition of an operator or edge, a removal of an operator or edge, a changed state of an operator or edge, or a changed parameter value of an operator or edge in the dataflow execution graph.

2. The computing system in accordance with claim 1, the altering the configuration of the dataflow execution graph being performed by the use of an intermediate dataflow execution graph that does not require that the dataflow execution graph as a whole perform blocking during the altering the configuration of the dataflow execution graph.

3. The computing system in accordance with claim 1, the configuration comprising an operational parameter that includes a batch size of events fed into the dataflow execution graph.

4. The computing system in accordance with claim 1, the monitored performance parameter comprising a latency of processing of events by the dataflow execution graph.

5. The computing system in accordance with claim 4, the configuration comprising a batch size of events fed into the dataflow execution graph such that the batch size is altered if the automatic determining results in the determination that the configuration should be changed.

6. The computing system in accordance with claim 1, the monitored performance parameter comprising a rate of processing of events by the dataflow execution graph.

7. The computing system in accordance with claim 1, the method being repeated such that the configuration is repeatedly altered.

8. The computing system in accordance with claim 1, the method being performed by a dataflow controller set of one or more dataflow controllers that are dedicated to the dataflow execution graph.

9. The computing system in accordance with claim 8, the dataflow controller set comprising a monitoring dataflow controller that performs the monitoring of the performance parameter of the dataflow execution graph.

10. The computing system in accordance with claim 9, the dataflow controller set comprising a reconfiguration dataflow controller that performs the altering of the configuration of the dataflow execution graph if the automatic determining results in a determination that the configuration should be changed.

11. A method for automatically tuning performance of a dataflow execution graph, the method comprising:
   monitoring a performance parameter of the dataflow execution graph, the dataflow execution graph comprising a plurality of operators, each operator configured to send or receive messages along one or more edges of the dataflow execution graph;
   comparing the monitored performance parameter against a service level objective;

based on the comparison, automatically determining whether a configuration of the dataflow execution graph should be changed; and altering the configuration of the dataflow execution graph if the automatic determining results in a determination that the configuration should be changed, the altered configuration comprising at least one of an addition of an operator or edge, a removal of an operator or edge, a changed state of an operator or edge, or a changed parameter value of an operator or edge in the dataflow execution graph.

12. A computer-readable storage medium having thereon computer-executable instructions that are structured such that, when executed by the one or more processors, cause a computing system to perform a method for automatically tuning performance of a dataflow execution graph, the method comprising:

monitoring a performance parameter of the dataflow execution graph, the dataflow execution graph comprising a plurality of operators, each operator configured to send or receive messages along one or more edges of the dataflow execution graph;

comparing the monitored performance parameter against a service level objective;

based on the comparison, automatically determining whether a configuration of the dataflow execution graph should be changed; and altering the configuration of the dataflow execution graph if the automatic determining results in a determination that the configuration should be changed, the altered configuration comprising at least one of an addition of an operator or edge, a removal of an operator or edge, a changed state of an operator or edge, or a changed parameter value of an operator or edge in the dataflow execution graph.

13. The method of claim 11, wherein the altering the configuration of the dataflow execution graph is performed by the use of an intermediate dataflow execution graph that does not require that the dataflow execution graph as a whole perform blocking during the altering the configuration of the dataflow execution graph.

14. The method of claim 11, wherein the configuration comprises an operational parameter that includes a batch size of events fed into the dataflow execution graph.

15. The method of claim 14, wherein the batch size is altered if the automatic determining results in the determination that the configuration should be changed.

16. The method of claim 11, the monitored performance parameter comprising at least one of a latency of processing of events by the dataflow execution graph or a rate of processing events by the dataflow execution graph.

17. The computer-readable storage medium of claim 12, wherein the altering the configuration of the dataflow execution graph is performed by the use of an intermediate dataflow execution graph that does not require that the dataflow execution graph as a whole perform blocking during the altering the configuration of the dataflow execution graph.

18. The computer-readable storage medium of claim 12, wherein the configuration comprises an operational parameter that includes a batch size of events fed into the dataflow execution graph.

19. The computer-readable storage medium of claim 18, wherein the batch size is altered if the automatic determining results in the determination that the configuration should be changed.

20. The computer-readable storage medium of claim 12, the monitored performance parameter comprising at least one of a latency of processing of events by the dataflow execution graph or a rate of processing events by the dataflow execution graph.

* * * * *